April 15, 1952 R. L. DIVOLL 2,593,014
ALTITUDE CONTROL SYSTEM
Filed April 26, 1946
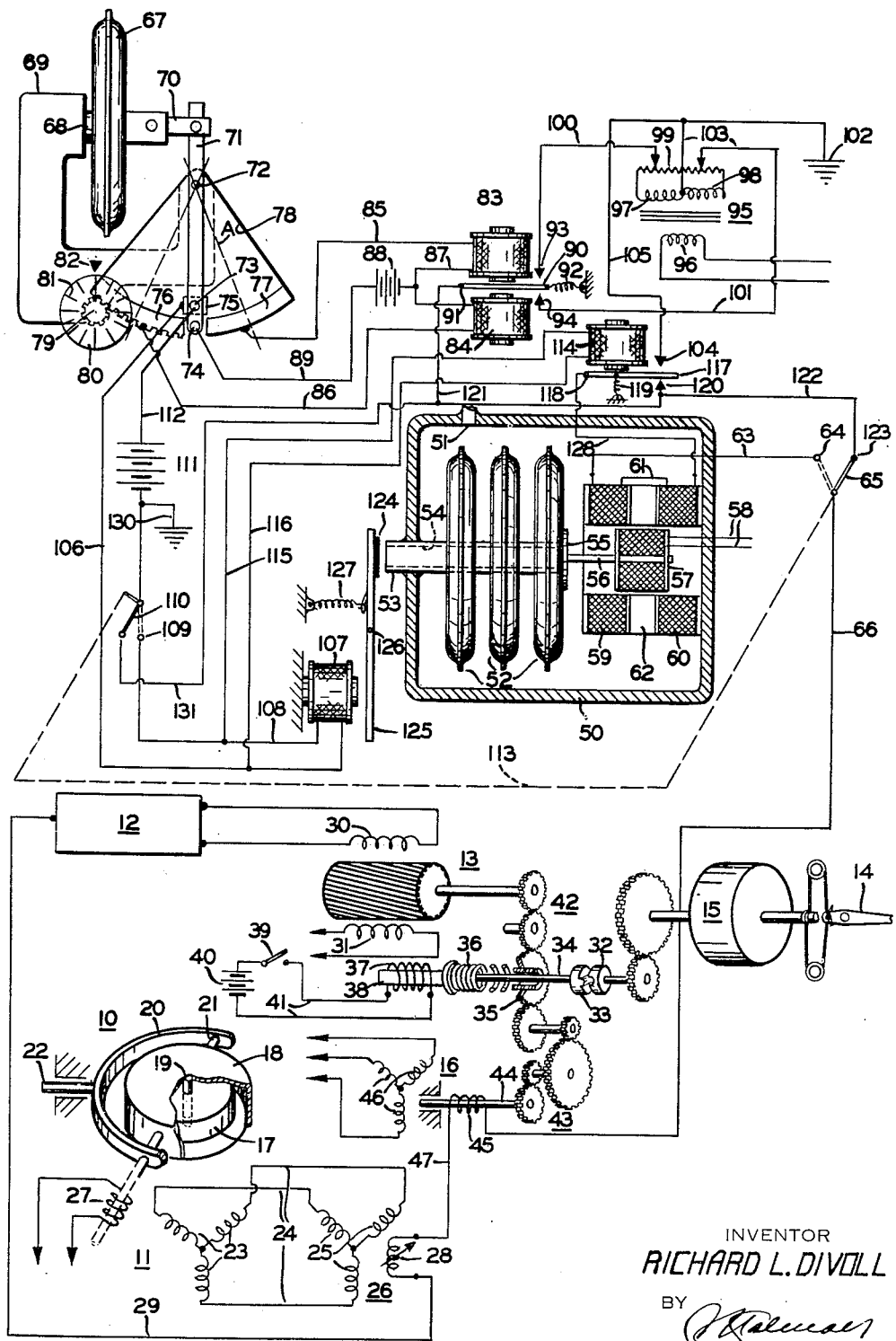
INVENTOR
RICHARD L. DIVOLL
BY
ATTORNEY Patented Apr. 15, 1952

2,593,014

UNITED STATES PATENT OFFICE 2,593,014

ALTITUDE CONTROL SYSTEM

Richard L. Divoll, Maywood, N. J., assignor to Bendix Aviation Corporation, Teterboro, N. J., a corporation of Delaware Application April 26, 1946, Serial No. 665,301

23 Claims. (Cl. 244—77)

1

The present invention relates generally to automatic steering systems for mobile craft such as aircraft, for example, and more particularly to novel altitude selector means therefor whereby the craft may be made to automatically climb or glide to any desired altitude level and, thereafter, be maintained in that altitude to within very close limits.

It is desirable, especially in connection with the take-off of commercial aircraft, for example, that the pilot, prior to take-off, be able to pre-select his desired altitude of flight so that the craft will automatically fly to the desired level and be, thereafter, maintained in that altitude level. Further, after flying a given altitude level for any given length of time it may be desirable to pre-select a second altitude level and, to be able to achieve and maintain the latter level automatically. Moreover, in the blind landing of aircraft, it is highly desirable that some provision be made for elevator control, operable either by remote control or by radio, for example, to cause the craft to properly and automatically descend to a designated landing field.

To the end that a desired altitude may be pre-selected and, thereafter, automatically attained and maintained, the present invention is provided. As such, the arrangement may be supplemental to the usual automatic steering system for maintaining a craft in a level attitude of flight so that the craft will traverse not only a level plane but one which is also defined by a desired altitude level. Moreover, the arrangement incorporates a diaphragm type of altitude control unit connected in series with the signal portion of the steering system to maintain the craft in a desired altitude and an aneroid operated selector switch by which any desired altitude may be pre-selected so that once the pre-set altitude is attained the switch is de-energized, the craft is levelled off, and the altitude control unit is effective to supply the proper control signal to the elevator.

An object of the present invention, therefore, is to provide a novel and automatic altitude control system for automatic piloting of aircraft.

Another object of the invention is to provide a novel and automatic altitude selector system for aircraft which may be independent of, or supplemental to, conventional automatic steering systems.

A further object is to provide a novel and automatic steering system for aircraft which may respond to pilot control and/or in the absence

2 of a pilot, may respond to remote control such as that provided by radio, for example, to pre-select a desired altitude whereby the craft will be automatically directed to the selected altitude and, once attained, will be automatically maintained thereon.

Another object is to provide a novel altitude selector switch for use in the automatic piloting of aircraft to a pre-selected and desired altitude.

A further object is to provide a novel control system for aircraft whereby a pilot may pre-select and automatically maintain a desired altitude of flight.

The above and further objects and novel features of the invention will appear more fully from the following detailed description when the same is read in connection with the accompanying drawing. It is to be expressly understood, however, that the drawing is for the purpose of illustration only and is not intended as a definition of the limits of the invention.

The single figure of the drawing is a diagrammatic illustration of the attitude control portion of a conventional automatic steering system embodying the novel altitude selector arrangement of the present invention.

The novel and automatic altitude selector mechanism hereof is shown as applied to the elevator control channel of a conventional all electric automatic pilot more fully described and claimed in copending application Serial No. 516,488 filed December 31, 1943. For a better understanding of the present invention, the elevator or pitch channel of the system is shown as comprising an artificial horizon gyro 10 provided with an electrical take-off 11 connected with the input of a conventional vacuum tube amplifier 12, the output of which energizes a two phase induction motor 13 for actuating an elevator surface 14 through a speed reduction gearing contained within a housing 15. Motor 13, during operation, also actuates an electrical follow-up device 16 which develops a follow-up signal for mixing with the signal of the take-off for modifying motor operation.

The artificial horizon 10 comprises a gyro rotor 17 mounted within a rotor case 18 for spinning about a normally vertical spin axis 19, any desired erecting mechanism being provided to maintain the spin axis substantially vertical. Rotor case 18 supports the rotor for oscillation about a first horizontal axis by its mounting within a gimbal ring 20 by way of inner trunnions 21, the rotor being further supported for oscillation about a second horizontal axis perpendicular to the first horizontal axis by reason of the gimbal being mounted by way of an outer trunnion 22 which is journalled on the craft, provided with the automatic control arrangement hereof, or within an instrument case secured to the craft. The axis defined by the outer trunnion 22 thus constitutes the craft bank axis while the transverse axis constituted by the inner trunnions defines the craft pitch axis.

Pitch take-off 11 comprises a transmitter which constitutes a three phase wound stator 23 which is connected by way of conductors 24 with a similar and remotely located three phase wound stator 25 of a pitch repeater device 26. Inductively coupled with stator 23 is a wound rotor 27 supported by one of inner trunnions 21 of the horizon gyro and energized from a suitable source of alternating current (not shown). Also inductively coupled with stator 25 is a wound rotor 28, one side of which connects by way of a lead 29 with the input of amplifier 12.

Normally, both wound rotors 27 and 28 are synchronously positioned and rotor 28 is at its electrical null, i. e., a position in which its electrical axis is normal to the resultant of the magnetic field at stator 25 so that no signal appears within rotor 28 even though current does flow in rotor 27. As soon, however, as relative displacement occurs between the horizon gyro and the craft's fore and aft axis, relative motion also occurs between stator 23 and its rotor so that varying voltages are induced within the windings of stator 23 which are communicated to the windings of stator 25. The resultant magnetic field in the latter stator is no longer normal to the electrical axis of rotor 28 so that the latter has a signal induced therein which is communicated to the amplifier and fed therefrom to energize the variable phase 30 of motor 13, the second phase 31 of which is constantly energized from a suitable source of alternating current (not shown).

Motor 13 drives elevator surface 14 through a servo clutch comprising two co-engaging faces 32 and 33, the former connecting through speed reduction gearing 15 with the elevator surface and the latter being supported by a shaft 34 within a hollow gear 35 which fixedly mounts clutch face 33 for rotation therewith but permits slidable or reciprocal motion thereof relative thereto for clutch engagement or disengagement. An extension of shaft 34 is provided with an enlarged end for retaining one end of a coil spring 36 therein, the opposite end of which abuts gear 35. Normally, spring 36 urges clutch face 33 out of engagement with clutch face 32.

For engaging the clutch and thereby defining a drivable connection between motor 13 and surface 14, a solenoid 37 is provided having a plunger 38 abutting the free end of shaft 34. Solenoid 37 is connected through a switch 39 with a battery 40 by way of leads 41 so that by closing the switch, the solenoid is energized and the plunger ejected therefrom to provide clutch engagement.

The motor, in driving clutch face 33 through a gear system 42 meshing with gear 35, also drives, through a speed reduction gear system 43, a shaft 44 carrying a wound rotor 45 thereon which is inductively coupled with a three phase wound stator 46 of electrical follow-up device 16. In this case, stator 46 is energized from a suitable source of alternating current (not shown) and normally rests in an electrical null position, i. e., one in which the electrical axis of the rotor is normal to the resultant magnetic field of stator 46. Motion of rotor 45 from its null develops a follow-up signal therein which is communicated to amplifier 12 to be there superimposed upon the pitch displacement channel, one end of the rotor being connected to the free end of wound rotor 28 by way of a lead 47 for this purpose.

With the development of a craft pitch condition, a signal proportional to the displacement of the craft fore and aft axis relative to level flight is developed within wound rotor 28 to energize motor 13 which, assuming clutch switch 39 to be closed, deflects elevator surface 14 to start returning the craft to level flight. With the operation of motor 13, rotor winding 45 of device 16 is displaced angularly whereby a follow-up signal is induced therein to be impressed on the displacement signal. As more fully described in the aforementioned copending application, the follow-up signal builds up until it is equal and opposite to the pitch signal whereupon motor 13 is de-energized at which time elevator 14 has assumed a given deflected position. As the craft returns to its level attitude, the pitch signal diminishes within rotor 28 and the follow-up signal predominates to reverse motor 13 until the elevator surface again assumes a neutral position at which time rotor winding 45 is returned to its null position and the follow-up signal drops to zero and, since the desired condition between rotor 27 and stator 23 of take-off 11 is reestablished, the signal within rotor winding 28 also drops to zero.

The system thus far described automatically maintains the craft in level flight but cannot, of itself, maintain craft flight in a desired altitude level and, to the latter end, an automatic altitude control unit is provided of the character more fully described and claimed in copending application Serial No. 660,342, filed April 8, 1946, now U. S. Patent No. 2,474,618 dated June 28, 1949, the unit comprising a casing 50 provided with a conduit 51 for communicating exterior pressure conditions to the interior of the casing. A series of diaphragms 52 are mounted for expansion and contraction within casing 50 by way of a shaft 53 having a passage 54 therein for communicating the interior of the diaphragm with the pressure existing outside of the casing. The free end of the outer diaphragm is provided with a disc 55 which supports a shaft 56 carrying a winding 57 thereon for linear motion therewith during contraction and expansion of the diaphragms. Winding 57 is energized from a suitable source of current (not shown) by way of leads 58 and is inductively coupled with a pair of stationary windings 59 and 60 connected in series opposed relation with each other by way of a lead 61.

Supporting windings 59 and 60 in fixed relation to the casing is a hollow core member 62 formed with two peripheral grooves for receiving the windings, the member being fastened to the casing in any desired manner. Normally movable winding 57 is centered with respect to fixed or stator windings 59 and 60 so that equal and opposite voltages are induced in the latter and no signal appears at their outputs. As soon, however, as the interior of the diaphragms is closed off from pressure changes, in a manner to appear hereinafter, the changes occurring within the casing cause diaphragms 52 to expand or contract and thus linearly displace winding 57 relative to windings 59 and 60 to thereby induce a greater voltage in one of the fixed windings than the other whereby a resultant signal is available at the output of the fixed windings for elevator control. Winding 59, for example, to this end, may be connected by a lead 63 to a switch terminal 64 which, while a switch 65 is closed, connects by way of a lead 66 in series with the free end of rotor winding 45 of follow-up device 16.

With the system thus far described, a craft embodying the automatic arrangement hereof will maintain a level attitude of flight and one at a desired altitude value. Coming now to the novel arrangement of the present invention whereby a pilot may manually or remotely pre-select a second desired altitude of flight so that the craft will automatically fly from a given altitude level to and be maintained in the new altitude level, a wide range aneroid 67 is provided which is mounted by way of a stud 68 on a fixed bracket 69, the free end of the aneroid carrying a link 70 which is pivotally connected to a lever arm 71, the latter being pivotally mounted on the bracket by way of a pin 72.

Arm 71 may be formed of insulating material and carries at its free end a pair of spaced contact members 73 and 74, the former cooperating with an annular conductor strip 75 and the latter with a pair of spaced annular conductor strips 76 and 77. The conductor strips are insulated from and fastened, in a suitable manner, to a sector member 78 which is pivotally mounted on bracket 69 by way of pin 72, the sector being provided with a toothed outer periphery for meshing with a pinion 79 carried by a setting knob 80 which is provided with a dial 81 adapted for cooperation with a fixed index 82 on bracket 69. Rotation of knob 80 provides angular displacement of the sector and its conductor strips 75, 76 and 77 relative to arm 71 and its contacts 73 and 74. Expansion or contraction of aneroid 67, on the other hand, will move arm 71 and its contacts 73 and 74 relative to the sector member and its conductor strips.

To provide an automatic change in craft elevation, even though the artificial horizon is not calling for such a change, a pair of relays 83 and 84 is provided, the former connecting by way of a lead 85 with conductor strip 77 and the latter connecting by way of a lead 86 with conductor strip 76. Both of the relays are interconnected by way of a lead 87 which is center tapped for connection with one side of a battery 88 the other side of which connects by way of a lead 89 with contact member 74 of arm 71. Interposed between the relays is an armature 90 pivoted at 91 and being normally centered by way of a spring 92 between two fixed contacts 93 and 94, the armature engaging contact 93 in response to the energization of relay 83 and contact 94 in response to the energization of relay 84.

The signal source for elevator control from the altitude selector arrangement comprises a transformer 95 having a primary winding 96 energized from a suitable source of current (not shown) and an inductively coupled secondary comprising a pair of series opposed connected windings 97 and 98 whose outer ends are interconnected through a resistor 99. Contact 93 connects with a part of resistor 99 by way of a lead 100 while contact 94 connects with another part of the resistor by way of a lead 101. The midpoint of the transformer secondary, i. e., the junction of the series opposed windings 97 and 98 is connected to ground 102 by way of a lead 103 and to a fixed contact 104 by way of a lead 105.

Conductor strip 75, carried by sector 78, is connected by way of a lead 106 with one side of a relay 107, the opposite side of which connects by way of a lead 108 through terminal 109 of a switch 110 with one side of a battery 111, the opposite side of which connects by way of a lead 112 with contact member 73 of arm 71. Switch 110 is normally in its "off" position, as shown, as is switch 65, the two being mechanically interconnected by way of a connection 113 for operation in unison.

A relay 114 is tapped to leads 106 and 108 by way of conductors 115 and 116 and operatively associated with the relay is an armature 117 pivoted at 118 and being normally urged by way of a spring 119 into engagement with a contact member 120, the latter connecting by way of a lead 121 with armature 90 of relays 83, 84 and by way of a lead 122 with an "off" terminal 123 of switch 65.

To the end that the interior of diaphragms 52 may be closed off from changing exterior pressures, a valve 124 is provided which is carried by an armature 125 of relay 107, the armature being pivoted at 126 and being normally urged by way of a spring 127 to a valve open position. Energization of relay 107 pivots armature 125 clockwise against the action of spring 127 to close passage 54 of diaphragm shaft 53 by way of valve 124.

Assuming switches 65 and 110 to be in the "off" position shown, the only control available for the elevator surface is that developed at take-off 11 and reproduced within repeater rotor 28 during a craft nose-up or nose-down condition or that developed within rotor 28 by angular displacement thereof for pitch trim purposes. If, for example, the craft is flying at an altitude of 8,000 feet and it is desired to thereafter fly at an altitude of 10,000 feet, the pilot either manually or remotely rotates knob 80 until a graduation of dial 81, corresponding to 10,000 feet altitude, is adjacent index 82. Rotation of the knob likewise causes displacement of sector 78 to the left, for example, relative to arm 71 through pinion 79. Switches 65 and 110 are subsequently actuated to their "on" positions, i. e., switch 110 engages terminal 109 while switch 65 engages terminal 64. Since the craft is, at this point, below the desired altitude level, aneroid 67 will be compressed and arm 71 will be at some position A, as shown in dotted lines, wherein its contact member 74 will engage conductor strip 77 to close the circuit through relay 83 whereupon armature 90 moves upwardly to engage contact member 93. Thus, an up-elevator signal is provided to control surface 14 to place the craft in a condition of climb. This circuit may be traced as follows: ground 102, lead 103, winding 97, resistor 99, conductor 100, contact 93, armature 90, lead 121, contact 120, armature 117 (relay 114 being de-energized at this time), a lead 128 connected with the output end of fixed winding 60, lead 61, winding 59, lead 63, terminal 64, switch 65, and lead 6 to amplifier input, the signal being in series with wound rotors 28 and 45.

Obviously, if the craft had been flying at an altitude of 10,000 feet and it was desired to bring it to an 8,000 foot altitude, knob 80 would be turned in an opposite direction to move sector 78 to the right, i. e., a position wherein contact member 74 would engage conductor strip 76 so that relay 84 would be energized to force armature 90 into engagement with contact member 94 and thereby provide a down-elevator signal from secondary winding 98. The latter circuit would be traced as follows: ground 102, lead 103, winding 98, resistor 99, lead 101, contact 94, armature 90, lead 121, etc.

As the craft attains a 10,000 foot altitude of the example first considered, the ambient pressure drops so that aneroid 67 expands and pivots arm 71 to the left until contact member 74 leaves conductor strip 77, i. e., enters an insulating portion intermediate strips 76 and 77, whereupon the circuit to relay 83 is broken and the latter, being de-energized, permits spring 92 to center armature 90 between contacts 93 and 94 so that the up-elevator signal is thereby interrupted.

Assuming the second example considered, on the other hand, as the desired altitude is reached, aneroid 67 will contract due to increased ambient pressure and move arm 71 to the right to disengage conductor strip 76 and thereby de-energize relay 84 and interrupt the down-elevator signal.

Once the pre-selected altitude has been attained with contact member 74 centered between strips 76 and 77 and relays 83 and 84 de-energized, the second contact member 73 of arm 71 will now engage conductor strip 75 of the sector. At this occurs the circuit is closed to energize relays 107 and 114 whereupon armature 125 is pivoted to close passage 54 of shaft 53 by way of valve 124 while armature 117 is forced from contact member 120 to engage fixed contact 104. The purpose of this latter arrangement is to place into the circuit, the altitude control unit so that any craft departure from the desired altitude after the latter has been attained will be counteracted. For example, should the craft, due to up-drafts, increase its altitude, diaphragms 52 will expand, since the pressure within the diaphragms at this point will be greater than the pressure within the casing, to displace winding 57 linearly to provide a greater voltage within winding 60 than in winding 59 so that a difference in potential exists between leads 63 and 128. Current thereupon flows through lead 63, terminal 64 and switch 65 to amplifier input. Lead 128 of winding 59 connects through armature 117 of relay 114, contact 104 and lead 105 to ground 102.

There has thus been provided a novel arrangement constituting an attitude maintaining means for an automatic steering system in the form of an artificial horizon gyro 10 and an electrical take-off 11, an altitude maintaining unit in the form of a diaphragm operated movable winding 57 and fixed windings 59 and 60 and an automatic altitude selector mechanism in the form of an aneroid operated arm 71 and its related relays 83 and 84. Moreover, the system provided is such that the altitude selecting and maintaining units may be disconnected from the steering system by simply operating switches 65 and 110 to their "off" positions.

Each time the pre-selector mechanism is operated to change craft level from one altitude to another, contact 73 of arm 71 leaves conductor strip 75 so that the circuit to relays 107 and 114 is broken, to be reestablished only when the new altitude is reached and contact 73 again engages with strip 75. In this manner the altitude control unit is operative only after a desired selected altitude is attained. The negative side of battery 111 is grounded as shown at 130 while the "off" terminal of switch 110 connects with lead 121 by way of conductor 131 so that when both switches 65 and 110 are moved to their "off" position, point 130 will constitute a ground connection for wound rotor 45.

It will now be apparent to those skilled in the art that by means of the novel arrangement hereof, a pilot may, while on the ground or at some altitude, pre-select a desired flight altitude and the craft is thereafter automatically directed to that altitude. When the desired altitude is reached, the selector mechanism is de-energized and an altitude control unit is automatically energized to thereafter automatically maintain the desired and pre-selected flight altitude.

Although only a single embodiment of the present invention has been illustrated and described in detail, it is to be expressly understood that the invention is not limited thereto. Various changes can be made in the design and arrangement of the parts without departing from the spirit and scope of the invention as will now be understood by those skilled in the art. For a definition of the limits of the invention, reference will be had primarily to the appended claims.

I claim:

1. An automatic altitude selector mechanism for an aircraft having a movable elevator surface thereon, comprising a signal source for actuating said elevator to change craft flight to a selected altitude, settable means which, when operated, connects said signal source to said elevator to change craft elevation to a selected altitude, means connected for operation by said settable means for disconnecting said signal source from said elevator when the craft attains the selected altitude, and means rendered effective when said selected altitude is reached for maintaining said aircraft at said selected altitude.

2. An automatic altitude selector mechanism for an aircraft having a movable elevator surface thereon, comprising a signal source for actuating said elevator to change craft flight to a selected altitude, settable means comprising an expansible and contractable member responsive to changes in pressure due to changes in altitude for connecting said signal source to said elevator for actuating the latter to change craft elevation to a desired altitude, means connected for operation by said settable means for disconnecting said signal source from said elevator when the craft attains the desired altitude, and means rendered effective when said desired altitude is reached for maintaining said aircraft at said desired altitude.

3. An automatic altitude selector mechanism for an aircraft having a movable elevator surface thereon, comprising a signal source for actuating said elevator to change craft flight to a selected altitude, control means for connecting said signal source to said elevator comprising two relatively movable members, a pressure responsive element for moving one of said members in response to pressure changes due to changes in altitude, a selector element for moving the other of said members an amount corresponding to a desired change in craft altitude, and means rendered effective when said desired change in altitude is effected for maintaining said aircraft at the new altitude brought about by said desired change in altitude.

4. An automatic altitude selector mechanism for an aircraft having a movable elevator surface thereon, comprising a signal source for actuating said elevator to change craft flight to a selected altitude, electrical means for connecting said signal source to said elevator, means for energizing said electrical means comprising two relatively movable members, a pressure responsive element for moving one of said members in response to changes in pressure due to changes in altitude, a selector element for moving the other of said members an amount corresponding to a desired change in craft altitude, and means rendered effective when said desired change in altitude is effected for maintaining said aircraft at the new altitude brought about by said desired change in altitude.

5. An automatic altitude selector mechanism for an aircraft having a movable elevator surface thereon, comprising a signal source for actuating said elevator to change craft flight to a selected altitude, relay means for connecting said signal source to said elevator, means comprising an electric control circuit for said relay means, means for opening or closing said circuit comprising two relatively movable members, a pressure responsive element for moving one of said members in response to changes in pressure due to changes in altitude, a selector element for moving the other of said members an amount corresponding to a desired change in craft altitude, and means rendered effective when said desired change in altitude is effected for maintaining said aircraft at the new altitude brought about by said desired change in altitude.

6. An automatic altitude selector mechanism for an aircraft having a movable elevator surface thereon, comprising a signal source for actuating said elevator to change craft flight to a selected altitude, relay means for connecting said signal source to said elevator, means comprising an electric circuit for controlling operation of said relay means, and settable means comprising a pressure responsive member for closing said electric circuit until the craft attains the selected altitude whereupon said circuit is opened by said pressure responsive member.

7. An automatic altitude selector mechanism for an aircraft having a movable elevator surface thereon, comprising an up-elevator and a down-elevator signal source for actuating said elevator to change craft flight to a selected altitude, a first relay means for connecting said up-elevator signal source to said elevator, a second relay means for connecting said down-elevator signal source to said elevator, means comprising an electric circuit for controlling operation of one of said relay means, means comprising a second electric circuit for controlling operation of the other of said relay means, settable means for closing one or the other of said circuits for changing craft elevation to a desired altitude, and expansible and contractable means responsive to changes in pressure due to changes in altitude for opening one or the other of said circuits when the desired altitude has been attained.

8. An automatic altitude selector mechanism for an aircraft having a movable elevator surface thereon, comprising a signal source for actuating said elevator to change craft flight to a selected altitude, means for connecting said signal source to said elevator, means comprising an electric circuit for controlling operation of said connecting means, settable means for closing said circuit whereby said elevator is actuated to change craft elevation to a desired altitude, expansible and contractable means responsive to changes in pressure due to changes in altitude for opening said circuit when the desired altitude has been attained, and means rendered effective when said desired altitude is attained for maintaining said aircraft at said desired altitude.

9. An automatic altitude selector mechanism for an aircraft having a movable elevator surface thereon, comprising a signal source for actuating said elevator to change craft flight to a selected altitude, relay means for connecting said signal source to said elevator, means comprising an electric circuit for controlling operation of said relay means, means for closing said circuit to energize said relay means whereby said elevator is actuated to change craft elevation to a desired altitude, selector means for operating said last-named means to pre-select the desired altitude, and a sealed expansible and contractable container responsive to changes in pressure due to changes in altitude for opening said circuit when the desired altitude has been attained.

10. An automatic altitude selector mechanism for an aircraft having a movable elevator surface thereon, comprising a signal source for actuating said elevator to change craft flight to a selected altitude, electrical means for connecting said signal source to said elevator comprising settable means for pre-selecting a desired altitude, a sealed expansible and contractable container responsive to changes in pressure due to changes in altitude for disconnecting said signal source from said elevator when the desired altitude has been attained, and means rendered effective when said desired altitude is attained for maintaining said aircraft at said desired altitude.

11. An altitude control system for an aircraft having a movable elevator surface thereon, comprising a signal source for actuating said elevator to change craft flight to a selected altitude, means for connecting said signal source to said elevator comprising settable means for pre-selecting a desired altitude, a sealed expansible and contractable container responsive to changes in pressure due to changes in altitude for disconnecting said signal source from said elevator when the desired altitude has been attained, and an altitude control unit brought into operation by said container when the desired altitude has been attained for automatically maintaining the latter craft altitude.

12. An altitude control system for an aircraft having a movable elevator surface thereon, comprising a signal source for actuating said elevator to change craft flight to a selected altitude, means for connecting said signal source to said elevator comprising settable means for pre-selecting a desired altitude, expansible and contractable means responsive to changes in pressure due to changes in altitude for disconnecting said signal source from said elevator when the desired altitude has been attained, an altitude control unit connected to said elevator for automatically maintaining the craft in the desired altitude once the latter has been attained, and means operable by said pressure responsive means for operating said unit.

13. An altitude control system for an aircraft having a movable elevator surface thereon, comprising a signal source for actuating said elevator to change craft flight to a selected altitude, means for connecting said signal source to said elevator comprising settable means for pre-selecting a desired altitude, an aneroid responsive to changes in pressure due to changes in altitude for disconnecting said signal source from said elevator when the desired altitude has been attained, a second signal source connected to said elevator for actuating the latter to automatically maintain the desired altitude when the latter has been attained, and pressure responsive means brought into operation by said aneroid when the desired altitude has been attained for operating said second signal source.

14. An altitude control system for an aircraft having a movable elevator surface thereon, comprising a signal source for actuating said elevator to change craft elevation to a selected altitude level, means for connecting said signal source to said elevator comprising settable means for pre-selecting a desired altitude level, a yieldable member responsive to changes in pressure due to changes in altitude for disconnecting said signal source from said elevator when the desired altitude has been attained, a second signal source connected to said elevator for actuating the latter to automatically maintain the desired altitude when the latter has been attained, normally centralized pressure responsive means for operating said second signal source normally exposed on both sides thereof to atmospheric pressure, and means operated by said yieldable member for closing one side of said pressure responsive means whereby the latter, in response to pressure changes due to altitude changes, expands or contracts to operate said second signal source.

15. An altitude control system for an aircraft having a movable elevator surface thereon, comprising a signal source for actuating said elevator to change craft elevation to a selected altitude level, a second signal source connected to said elevator for actuating the latter to maintain the selected altitude level, means for connecting said first signal source to said elevator comprising settable means for pre-selecting said altitude level, a yieldable member responsive to changes in pressure due to changes in altitude for operating said connecting means to disconnect said first signal source from said elevator when the desired altitude level has been attained, and means brought into operation by said yieldable member when said altitude level has been attained for operating said second signal source in response to changes in craft elevation from said desired altitude level.

16. An automatic altitude selector mechanism for an aircraft having a movable elevator surface thereon, comprising a signal source for actuating said elevator to change craft flight to a selected altitude level, means for connecting said signal source to said elevator comprising settable means for pre-selecting a desired altitude level, means comprising a knob for actuating said settable means, and a yieldable member responsive to changes in pressure due to changes in altitude for disconnecting said signal source from said elevator when the desired altitude level has been attained.

17. In combination with an altitude control unit for actuating the elevator of an aircraft to maintain the latter in a predetermined altitude of flight, comprising a signal source and a normally centralized pressure responsive member normally open on both of its sides to atmospheric pressure for operating said signal source, relay means which, when energized, closes one side of said member whereby the latter expands or contracts in response to pressure changes due to changes in altitude and which, when de-energized, opens said one side of said member so that the latter is centralized notwithstanding pressure changes acting thereon, an altitude selector mechanism for actuating said elevator to change craft flight to a desired altitude level, and means operated by said selector mechanism for de-energizing said relay means prior to the time that the craft attains the desired altitude level and for energizing said relay means when the craft attains the desired altitude level.

18. In combination with an altitude control unit for actuating the elevator of an aircraft to maintain the latter in a predetermined altitude of flight, comprising a signal source and a normally centralized pressure responsive member normally open on both of its sides to atmospheric pressure for operating said signal source, valve means for closing one side of said member whereby the latter expands or contracts in response to pressure changes due to changes in altitude and for opening said one side of said member whereby the latter is centralized notwithstanding pressure changes acting thereon, an altitude selector mechanism for actuating said elevator to change craft flight to a desired altitude level, and means operated by said selector mechanism for opening said valve means prior to the time the craft attains the desired altitude level and for closing said valve means when the craft attains the desired altitude level.

19. An altitude control system for an aircraft having a movable elevator surface, comprising a sensitive altitude control unit adapted to be connected to said surface for actuating the latter when the craft departs from a prescribed altitude to return it to said prescribed altitude, an altitude selector mechanism also adapted to be connected to said surface for assuming primary control of the latter to bring said aircraft from the prescribed altitude to another selected altitude, means for connecting said sensitive altitude control unit and said selector mechanism to said surface, and means actuated in response to operation of said selector mechanism for rendering said sensitive altitude control unit inoperative until said selected altitude is reached and for rendering said sensitive altitude control unit operative after said selected altitude is reached to thereafter maintain the aircraft at said selected altitude.

20. An automatic altitude control system for an aircraft having a movable elevator surface, comprising an altitude selector mechanism adapted to be connected to said surface for assuming primary control of said surface to bring said aircraft from a prescribed altitude to another selected altitude, means for connecting said altitude selector mechanism to said surface, a sensitive altitude control unit for actuating said surface to maintain the craft at the selected altitude after said selected altitude has been attained, and means interconnecting the altitude selector mechanism with the altitude control unit and actuated in response to operation of said altitude selector mechanism for rendering said sensitive altitude control unit inoperative until said selected altitude is attained.

21. An automatic altitude control system for an aircraft having a movable elevator surface comprising an altitude selector mechanism adapted to be connected to said surface for assuming primary control of the latter to bring said aircraft from a prescribed altitude to another selected altitude, means for connecting said mechanism to said surface, means for setting said mechanism an amount corresponding to a desired change in altitude of the aircraft, a sensitive altitude control unit connected to said selector mechanism and controlled thereby for actuating said surface to maintain the craft at the selected altitude once said selected altitude has been attained, and means actuated in response to operation of said selector mechanism for rendering said sensitive altitude control unit inoperative until said selected altitude is attained and for rendering it operative after said selected altitude is attained.

22. An automatic altitude selector mechanism for an aircraft having a movable elevator surface thereon, comprising a signal source for actuating said elevator to change craft flight to a selected altitude level, means for connecting said signal source to said elevator including settable means for pre-selecting the desired altitude level, means for actuating said settable means, a yieldable member responsive to changes in pressure due to changes in altitude for disconnecting said signal source from said elevator when the desired altitude level has been attained, and an altitude control unit brought into operation by said yieldable member when the desired altitude level has been attained for automatically maintaining the craft in said altitude level.

23. A system for controlling the flight altitude level of an aircraft having a movable elevator surface, comprising a sensitive pressure responsive unit adapted to be connected to said surface for actuating the latter to maintain the craft in a prescribed altitude level, an altitude selector mechanism also adapted to be connected to said surface for assuming primary control of said surface to bring the craft from the prescribed altitude to another and selected altitude, means for connecting said pressure responsive unit and said selector mechanism to said surface, and means for rendering said pressure responsive unit ineffective while said altitude selector mechanism is operating and until the selected altitude is reached and for rendering it effective when the selected altitude is attained to thereafter maintain the craft at the selected altitude.

RICHARD L. DIVOLL.

REFERENCES CITED

The following references are of record in the file of this patent:

UNITED STATES PATENTS

| Number | Name | Date |
|---|---|---|
| 2,091,300 | Bassett et al. | Aug. 31, 1937 |
| 2,358,803 | Hanson et al. | Sept. 26, 1944 |
| 2,410,502 | Hurley | Nov. 5, 1946 |
| 2,415,429 | Kellogg et al. | Feb. 11, 1947 |
| 2,415,430 | Frische et al. | Feb. 11, 1947 |
| 2,443,748 | Sanders et al. | June 22, 1948 |
| 2,474,618 | Divoll | June 28, 1949 |